United States Patent [19]
Price, Jr.

[11] 3,876,969
[45] Apr. 8, 1975

[54] SAFETY DEVICE

[76] Inventor: James R. Price, Jr., 1860 Lone Oak Cir. West, Brookfield, Wis. 53005

[22] Filed: Oct. 4, 1973

[21] Appl. No.: 403,530

[52] U.S. Cl. .............. 340/1 R; 192/129 R; 192/130; 340/15
[51] Int. Cl. .............................................. G01s 9/66
[58] Field of Search ........ 340/1 R, 3 R, 16 R, 16 C, 340/419, 15; 181/.5 NP, 123–124; 192/129 R, 129 A, 129 B, 130, 132

[56] References Cited
UNITED STATES PATENTS

| | | | |
|---|---|---|---|
| 2,963,627 | 12/1960 | Buchsbaum | 192/130 |
| 3,149,561 | 9/1964 | Lancaster | 340/1 R |
| 3,265,387 | 8/1966 | Alix et al. | 340/16 C |

*Primary Examiner*—Richard A. Farley
*Attorney, Agent, or Firm*—Fred Wiviott

[57] ABSTRACT

A safety device for machine tools including a transmitter for delivering a signal of sonic frequency to a selected area of the tool, a receiver arranged in a predetermined relation to the selected area and operable to provide an output signal when an emitter signal of predetermined magnitude is received and a control responsive to the output signal from the receiver for enabling the machine operation in response to an output signal.

14 Claims, 6 Drawing Figures

SAFETY DEVICE

BACKGROUND OF THE INVENTION

This invention relates to safety devices and more particularly to devices for preventing operation of a machine tool when there is a danger of operator injury.

Various apparatus have been employed in the past for preventing the operation of a machine tool when a portion of the operator's body is in an area where there is a strong likelihood of injury. For example, one type of apparatus requires that the operator depress energizing switches which are widely spaced apart to insure that his hands are not in an area where they would be exposed to injury by moving machine parts. Another type of apparatus employs a light beam and photocell which pass through the danger area so that if the light beam is interrupted by the operator's hand, for example, the machine would be rendered inoperative.

Photocell type safety devices, however, have not been wholly satisfactory because they could not discriminate between objects required to be in the critical area, such as parts of the machine or the work piece, and objects such as the operator's hand. In addition, photocell type devices require that the light source and photocell be in alignment, thus limiting their application and rendering installation relatively difficult. Further, vibration and shock inherent in a machine tool application tends to move the photocell and light source out of alignment in addition to the possibility of rendering one or the other inoperative.

SUMMARY OF THE INVENTION

It is an object of the invention to provide a new and improved safety device.

Another object of the invention is to provide a safety device having particular but not exclusive application to machine tools wherein straight line orientation is not required.

A further object of the invention is to provide a safety device which discriminates between portions of the operator's body and portions of a work piece or machine tool portion in the work area.

Another object of the invention is to provide a safety device for preventing operation of apparatus such as machine tools wherein the device is not sensitive to vibration and shock.

In general terms the invention comprises a safety device having particular but not exclusive application to machine tools and having a transmitter for delivering a sonic frequency signal toward the restricted area, a receiver for said signal arranged relative to a restricted area for receiving the transmitted signal, the intensity of which is a function of the mass disposed in the restricted area and a control circuit responsive to an output signal from the receiver for performing a control function relative to the machine tool.

DETAILED DESCRIPTION OF THE PREFERRED EMBODIMENTS

Figure 1:
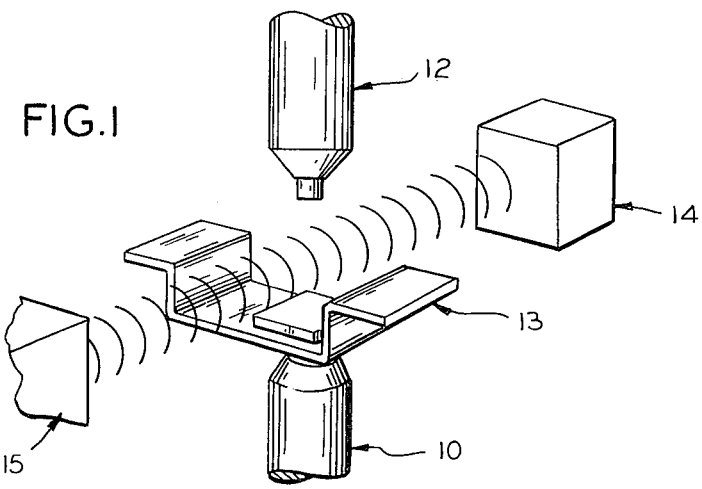
FIG. 1 shows a portion of a machine tool with which the safety device, according to the invention, may be employed.

FIG. 1 shows a portion of a machine tool, such as a rivet setting apparatus, to which the protective device according to the invention is applicable. More specifically, the rivet setting apparatus may include a stationary anvil 10 and a movable driver 12. Those skilled in the art will appreciate that when the tool is actuated, the driver 10 will move rapidly downwardly toward the anvil 10 for setting a rivet in the work piece 13.

The safety apparatus according to the invention includes a sonic transmitter 14 and a sonic receiver 15, which in the illustrated embodiment, are disposed on the opposite sides of the work area occupied by the work piece 13 and between the anvil 10 and the driver 12. As will be discussed more fully hereinbelow, the transmitter 14 will emit a wave of sonic frequency through this work area. The receiver 15 is positioned to receive at least a portion of the wave emitted from transmitter 14. The intensity of the received wave will be a function of the distance between the transmitter 14 and the receiver 15 and the mass located in the path therebetween.

Figure 2:
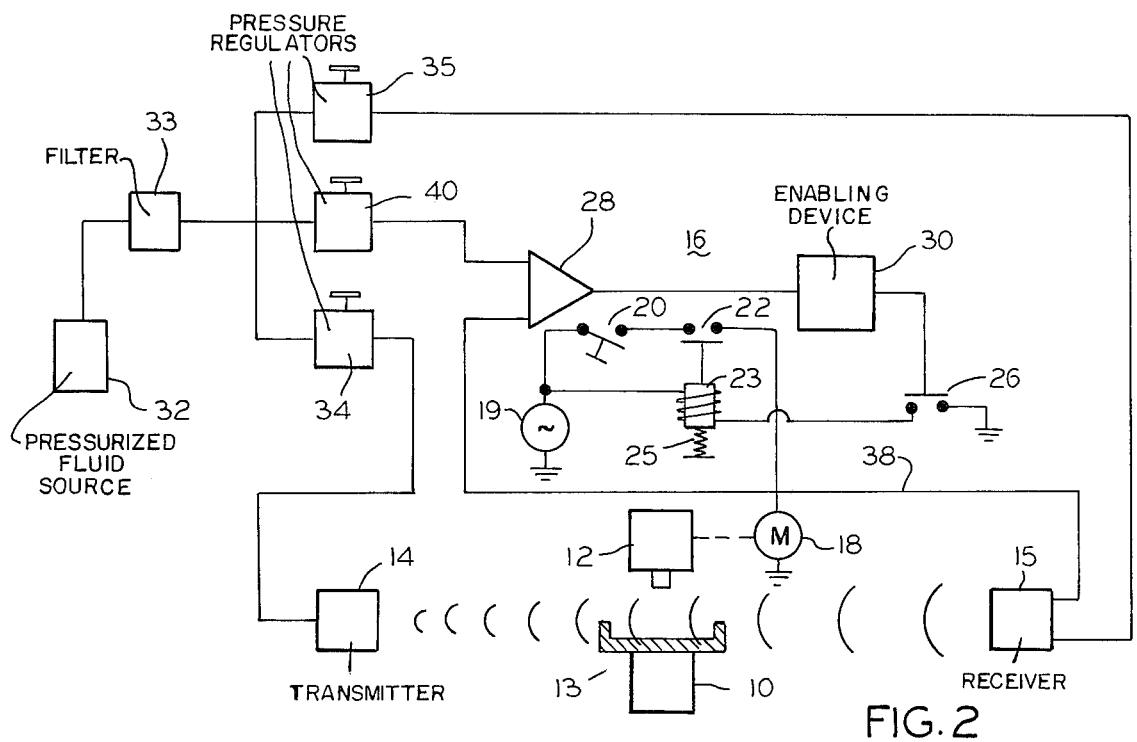
FIG. 2 schematically illustrates a first embodiment of the invention.

FIG. 2 schematically illustrates the anvil 10 control system 16 which includes the transmitter 14 and receiver 15. Anvil 10 may be driven by any suitable motor 18, which is illustrated as being electrical, but it will be appreciated by those skilled in the art that motor 18 may be fluid operated by analogous hydraulic or pneumatic systems. Motor 18 may be connected to a suitable energy source 19 by a push button starting switch 20 and the contacts 22 of a relay 23 which are held in a normally open position by a spring 25. An energizing circuit may be completed to relay 23 whereupon contacts 22 will be closed when contacts 26 are closed by the operation of the circuit 16 as will be described below. From the description thus far it will be appreciated that relay 23 will remain deenergized and prevent the actuation of drive motor 18 unless circuit 16 closes contacts 26 thereby indicating that the gap between anvil 10 and driver 12 is clear to the desired degree.

In addition to the transmitter 14 and the receiver 15, the system 16 may include an amplifier 28 coupled to the receiver 14 and an actuator or enabling device 30 coupled to the amplifier 28 for closing contacts 26 when a predetermined amplified signal is received. In the illustrated embodiment, the transmitter 14 and the receiver 15 may be fluid operated, although it will be appreciated that electrically operated transmitters and receivers may also be employed. With fluid operated devices, the transmitter 14 is coupled to a source 32 of fluid under pressure, such as air, through a suitable filter 33 and a first pressure regulator 34. Similarly, receiver 15 is coupled to the source 32 through filter 33 and a second pressure regulator 35. A combination sonic transmitter 14 and receiver 15 which was found to be suitable for the described application is Part Number 6090071, manufactured by Automatic Switch Company. Transmitter 14 transmits a sonic signal, preferably at a frequency which is higher than factory background noise, such as 50 KHz for example. The receiver 15 output is coupled by conduit 38 to the amplifier 28 and is constructed and arranged such that the pressure of the output signal provided to conduit 38 for any given input pressure from pressure regulator 35 is a function of the input pressure to transmitter 14 as provided through pressure regulator 34, the distance or span between transmitter 14 and receiver 15 and the mass in said span. Thus, for a given span and setting of pressure regulator 34, the output pressure from receiver 15 will be at some threshold value for actuating the actuator device 30 when some minimum mass is in the work area. Because the output of receiver 15 comprises a fluid pressure, the amplifier 28 preferably comprises a pressure amplifier operable to provide a fluid output signal having a predetermined pressure when a minimum threshold pressure is received. One such device found to be satisfactory for this application is the Visi-Amp fluid logic pressure amplifier model No. FPA-5P sold by the Double A division of Brown and Sharp Manufacturing Co. Such devices are constructed and arranged to provide an output signal which is approximately 95% of supply pressure when a predetermined signal pressure is received. Supply pressure to amplifier 28 may be provided from source 32 through a third pressure regulator 40. The pressure regulators 34, 35, and 40 may be any well known type. One pressure regulator found to be satisfactory for this application was type A-10PL-122 manufactured by Bellofram Corporation.

The actuator 30 may be of any suitable type which is operative to perform an electrical switching operation in response to a predetermined pressure input. A device found to be satisfactory for this application is Double A pressure to electric switch series FES-S15 manufactured by the Double A Division of Brown and Sharp Manufacturing Co.

While the transmitter 14, the receiver 15, the amplifier 28, and the output device 30 are all illustrated as being fluid operated, those skilled in the art will appreciate that analogous electrical components may also be employed.

In operation of the system illustrated in FIG. 2, pressure regulators 35 and 40 which control the supply pressure to the receiver 15 and the amplifier 28 are adjusted such that when a predetermined signal is received by receiver 15, the amplifier will provide the requisite output signal to actuator 30 to perform the desired control function. The work piece 13 is then positioned in the gap between transmitter 14 and receiver 15. The pressure regulator 34 is then adjusted such that the output from transmitter 14 is just sufficient to produce the required threshold output signal from receiver 15 which would be necessary to actuate the enabling device 30.

After the control 16 has been adjusted, the operator may place a work piece 13 on the anvil 10 at the commencement of each operation. While the operator's hands are in this area, the sonic wave intensity received by receiver 15 will fall below the threshold level required to maintain the enabling device 30 in an actuated position whereupon contacts 26 will open to deenergize relay 23 whereupon spring 25 will hold contacts 22 in an open position to insure that the drive motor 18 is deenergized. Should the operator attempt to close the switch 20 while his hands remain in the path between transmitter 14 and receiver 15, the drive motor 12 will remain inactive. When the operator removes his hands from the impact area of driver 12, the output from receiver 15 will increase sufficiently to actuate enabling device 30 which then closes contacts 26 to energize relay 23 whereupon the motor 18 may be actuated when switch 20 is closed.

Figure 3:
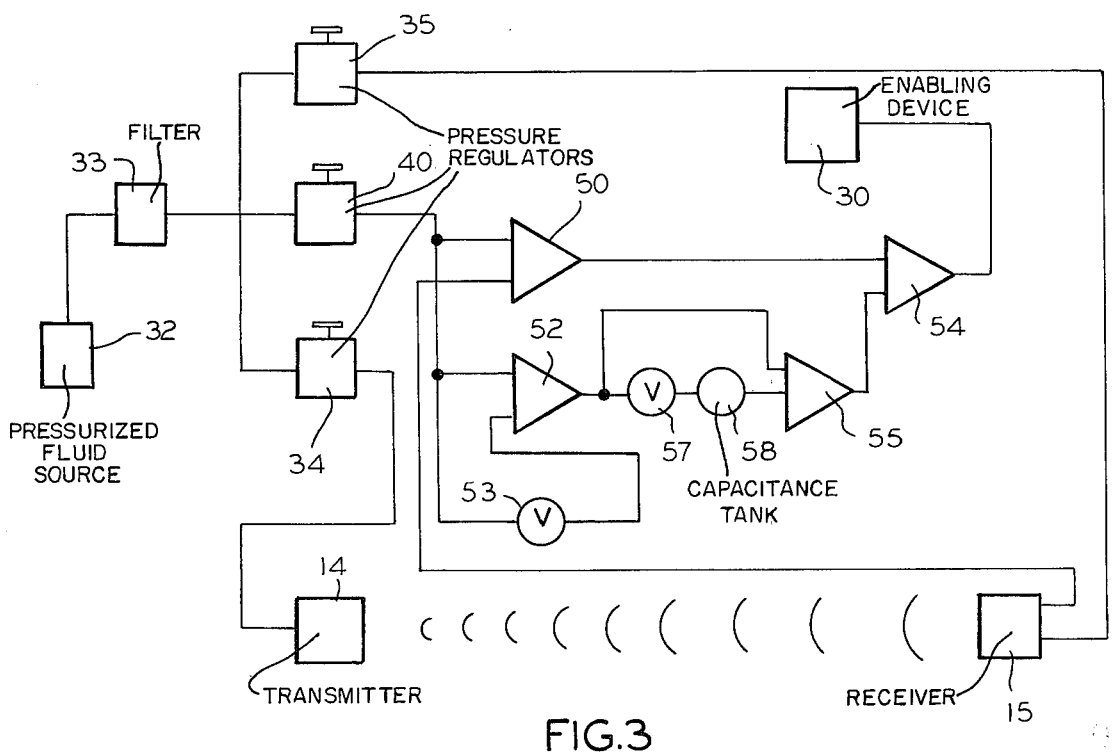
FIG. 3 shows an alternate embodiment of the invention.

FIG. 3 shows an alternate embodiment of the invention which is effective to prevent a plurality of machine operations for any given operator initiated signal. The system of FIG. 3 includes an emitter 14, a receiver 15, a fluid pressure source 32, a filter 33, pressure regulators 34, 35, and 40, and an output switching device 30. These elements perform the same functions as the correspondingly numbered elements in the embodiment of FIG. 2 and, accordingly, they will not be discussed in detail. The embodiment of FIG. 3 also includes a pair of amplifiers 50 and 52 each of which are coupled to receive supply pressure from pressure regulator 40. The input pressure to amplifier 50 consists of the output signal from receiver 15 whereby amplifier 50 will provide an output signal when receiver 15 receives the threshold signal as discussed with respect to the embodiment of FIG. 2. The input signal to amplifier 52 is provided by a pressure switch 53 which when actuated couples amplifier 50 to the pressure regulator 40. A third amplifier 54 is coupled to receive supply pressure from the output of amplifier 50. A fourth amplifier 55 is coupled to the output of amplifier 52 for receiving supply pressure and its input is connected to the output of amplifier 52 through a time delay circuit comprising a valve 57 and a capacitance tank 58. Thus, when amplifier 52 is actuated by valve 53, the supply of amplifier 55 will receive a pulse while the pulse to the input terminal of amplifier 55 is time delayed. Amplifier 55 is arranged such that it will be normally on so that in the absence of an input pressure, amplifier 55 will provide an output signal, while the presence of a control signal will turn amplifier 55 off.

In operation of the embodiment of FIG. 3, receiver 15 will provide a supply signal to amplifier 50 whenever there is an absence of excess mass, such as a hand, in the work space. In this condition, amplifier 50 will provide a supply signal to amplifier 54. Should the operator open the foot valve 53, amplifier 52 will be actuated to provide supply pressure to amplifier 55 so that if the work area remains clear, an output signal is provided to actuator 30 which permits the initiation of a machine operation. The valve 57 and capacitance tank 58 delay the delivery of input pressure to amplifier 55. After a short time delay, however, the input pressure will be provided to amplifier 55 which then turns off, turning off amplifier 54. This prevents a repeat operation of actuator 30 even though the operator retains valve 53 in an open condition. In order to perform a subsequent operation, valve 53 must be closed, thereby turning amplifier 52 off, which, in turn, turns off amplifiers 54 and 55. Of course, if the operator's hand is in the work area, no output will be provided from amplifier 55, so that machine operation is prevented as discussed with regard to FIG. 2.

Figure 4:
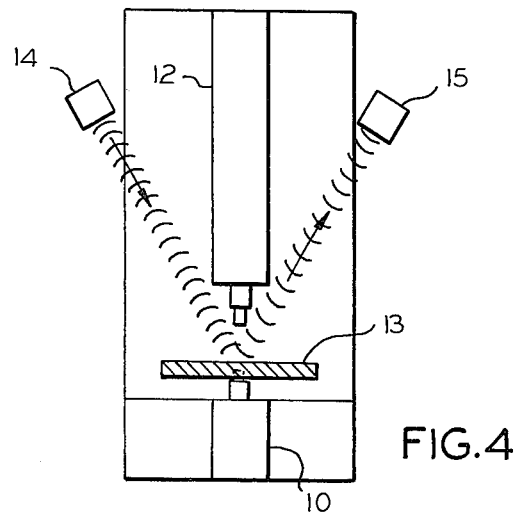
FIG. 4 shows an alternate method of applying the apparatus according to the invention to a machine tool.

FIG. 4 illustrates an alternate embodiment of the invention wherein the transmitter 14 and receiver 15 are disposed in an elevated relation along the sides of the driver 12 and are aimed downwardly and inwardly toward the work piece 13. The transmitter 14 and receiver 15 are oriented such that the receiver is responsive to waves which are reflected off the work piece 13.

This orientation is possible where the work piece surface is suitable to reflect the sonic waves. This arrangement has the advantage over the arrangement illustrated in FIG. 1 in that transmitter 14 and receiver 15 can be adjusted and arranged whereby an output signal will be provided by the receiver 15 only when the work piece 13 is in position and correctly oriented. In this manner, the machine tool can be prevented from operating should the work piece 13 not be in place or be improperly positioned. In addition, the arrangement of FIG. 4 provides protection to the operator in the manner discussed with respect to FIGS. 1–3.

Figure 5:
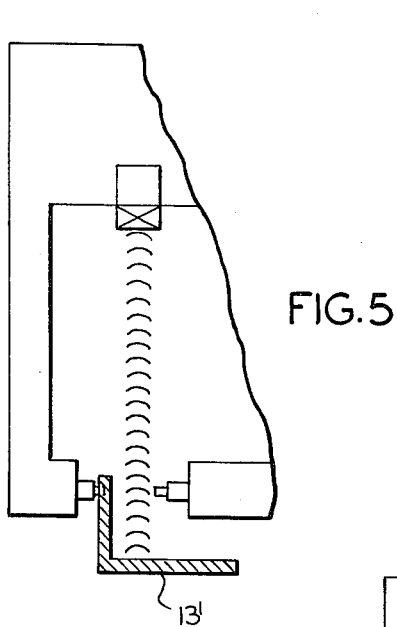
FIGS. 5 and 6 show another alternate method of applying the apparatus of the invention to a machine tool.
Figure 6:
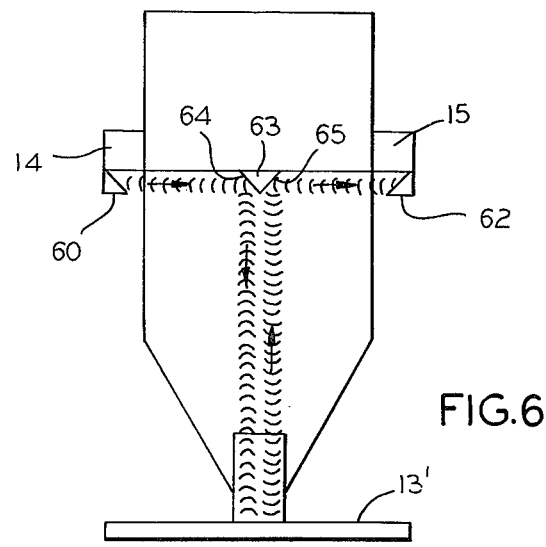

FIGS. 5 and 6 show a further alternate embodiment of the invention wherein the transmitter 14 and receiver 15 are disposed along the sides of the machine tool and oriented vertically downwardly. A first reflector 60 is located below the transmitter 14 and a second reflector 62 is located below the receiver 15. The reflectors 60 and 62 are arranged at an angle of 45° relative to a line from the transmitter 14 and receiver 15, respectively. In addition, a third reflector 63 is located intermediate the reflectors 60 and 62 and in alignment therewith and has a pair of reflective surfaces 64 and 65, each of which faces downwardly and is angled at approximately 45° relative to the horizontal. As illustrated in FIG. 6, the transmitter wave is first reflected 90° by reflector 60 toward the reflector surface 64 from which it is reflected downwardly toward the critical area for reflection off the work piece 13 back upwardly to the reflective surface 65 toward reflector 62 and to the receiver 15.

While only a few transmitter and receiver arrangements have been shown and described, it will be appreciated that various other arrangements may be provided without deviating from the invention. In addition, while pressure operated devices have been illustrated, those skilled in the art will appreciate that analogous electrically operated devices may also be employed. Also, while the invention is illustrated in connection with a rivet setting tool, it will be appreciated that it has application to other types of machine tools as well.

I claim:

1. A safety device for a power operated apparatus having an operative means movable through a work area and from a first position to a second position,
   a sonic frequency transmitter for transmitting a sonic frequency signal through said work area,
   a sonic receiver disposed to receive said signal after passage through said work area,
   control means connected to said operative means for effecting the movement thereof for performing a work operation,
   operation initiating means for actuating said control means,
   and enabling means coupled to said control means and operative when in a first state to prevent operation of said operative means and when in a second state to enable such operation,
   said receiver being coupled to said enabling means and operative to switch said enabling means from its first state to its second state when the level of the sonic frequency signal received by the receiver rises above a predetermined magnitude, said receiver returning said enabling means to its first state when said level falls below said magnitude.

2. The device set forth in claim 1 and including means for adjusting the level of the sonic frequency signal received by said receiver so that said level is above the predetermined magnitude when the work area is unoccupied by a portion of the operator's body and below said magnitude when a portion of the operator's body is disposed in said work area.

3. The apparatus set forth in claim 2 wherein a work piece is located within the work area, said transmitter being oriented such that the transmitted sonic frequency signal will be reflected from said work piece when the latter has a predetermined position relative to the power operated apparatus, said receiver being positioned to receive said reflected signal when said work piece is in said predetermined position.

4. The apparatus set forth in claim 3 wherein said transmitter and receiver are located in a generally elevated lateral position relative to said work piece, said transmitter being oriented to transmit said sonic signal generally downwardly, first reflective means disposed to receive said signal and oriented for reflecting said sonic signal generally horizontally and inwardly toward said work piece, second reflective means disposed above the work piece and oriented for reflecting said signal downwardly, third reflective means disposed above said work piece for receiving the signal and oriented to reflect the same laterally toward said receiver, and fourth reflective means disposed below said receiver for reflecting the signal upwardly toward said receiver.

5. The device set forth in claim 3 and including time delay means coupled to said enabling means for disabling said enabling means after a predetermined time delay to prevent repeat operations of said power operated apparatus after the initiation of an operation.

6. The apparatus set forth in claim 5 wherein said transmitter is constructed and arranged to transmit a sonic frequency signal functionally related to an input pressure signal and said receiver is constructed and arranged to provide a predetermined output pressure signal in response to a predetermined input pressure signal and functionally related to the received sonic frequency signal, pressure amplifier means coupled to receive the output pressure signal from said receiver, said enabling means being pressure responsive and coupled to said amplifier means and operative to perform an enabling function upon the receipt of a predetermined amplified pressure signal.

7. The device set forth in claim 6 and including means for adjusting the input pressure to at least one of said amplifier and receiver means for adjusting the receiver output signal to some predetermined value in the absence of interferring mass in said work area in excess of a predetermined amount.

8. The apparatus set forth in claim 1 wherein a work piece is located within the work area, said transmitter being oriented such that the transmitted sonic frequency signal will be reflected from said work piece when the latter has a predetermined position relative to the power operated apparatus, said receiver being positioned to receive said reflected signal when said work piece is in said predetermined position.

9. The apparatus set forth in claim 1 wherein said transmitter is constructed and arranged to transmit a sonic frequency signal functionally related to an input pressure signal and said receiver is constructed and arranged to provide a predetermined output pressure signal in response to a predetermined input pressure signal and functionally related to the received sonic frequency signal, pressure amplifier means coupled to receive the output pressure signal from said receiver, said enabling means being pressure responsive and coupled to said amplifier means and operative to perform an enabling function upon the receipt of a predetermined amplified pressure signal.

10. The device set forth in claim 9 and including means for adjusting the input pressure to at least one of said amplifier and receiver means for adjusting the receiver output signal to some predetermined value in the absence of interferring mass in said work area in excess of a predetermined amount.

11. The device set forth in claim 9 wherein said sonic frequency signal is in the order of 50 KHz.

12. The device set forth in claim 1 and including time delay means coupled to said enabling means for disabling said enabling means after a predetermined time delay to prevent repeat operations of said power operated apparatus after the initiation of an operation.

13. The apparatus set forth in claim 1 wherein said transmitter is constructed and arranged to transmit a sonic frequency signal functionally related to an input pressure signal and said receiver is constructed and arranged to provide a predetermined output pressure signal in response to a predetermined input pressure signal and functionally related to the received sonic frequency signal, pressure amplifier means coupled to receive the output pressure signal from said receiver, said enabling means being pressure responsive and coupled to said amplifier means and operative to perform an enabling function upon the receipt of a predetermined amplified pressure signal.

14. The device set forth in claim 13 and including means for adjusting the input pressure to at least one of said amplifier and receiver means for adjusting the receiver output signal to some predetermined value in the absence of interferring mass in said work area in excess of a predetermined amount.

* * * * *